US009632676B1

(12) United States Patent
Gindi et al.

(10) Patent No.: US 9,632,676 B1
(45) Date of Patent: Apr. 25, 2017

(54) SYSTEMS AND METHODS FOR NAVIGATING A SET OF DATA OBJECTS

(71) Applicant: Twiggle Ltd., Tel-Aviv (IL)

(72) Inventors: Udi Gindi, Tel-Aviv (IL); Amir Konigsberg, Tel-Aviv (IL); Adi Avidor, Tel-Aviv (IL)

(73) Assignee: Twiggle Ltd., Tel-Aviv (IL)

( * ) Notice: Subject to any disclaimer, the term of this patent is extended or adjusted under 35 U.S.C. 154(b) by 0 days.

(21) Appl. No.: 14/882,679

(22) Filed: Oct. 14, 2015

(51) Int. Cl.
G06F 3/0482 (2013.01)
G06F 3/0484 (2013.01)
G06F 17/30 (2006.01)

(52) U.S. Cl.
CPC ........ G06F 3/04842 (2013.01); G06F 3/0482 (2013.01); G06F 17/3053 (2013.01); G06F 17/3056 (2013.01)

(58) Field of Classification Search
CPC ............... G06F 3/0482; G06F 17/3053; G06F 17/3056; G06F 17/30067; G06F 17/30286; G06F 8/34
See application file for complete search history.

(56) References Cited

U.S. PATENT DOCUMENTS

| | | | | |
|---|---|---|---|---|
| 6,963,867 B2 * | 11/2005 | Ford | ................ | G06F 17/30705 707/752 |
| 8,396,864 B1 * | 3/2013 | Harinarayan | ..... | G06F 17/30707 707/722 |
| 8,620,891 B1 * | 12/2013 | Thirumalai | ....... | G06F 17/30867 707/705 |
| 2003/0195877 A1 * | 10/2003 | Ford | ................. | G06F 17/30705 |
| 2004/0267731 A1 * | 12/2004 | Gino Monier | .... | G06F 17/30699 |
| 2005/0080771 A1 * | 4/2005 | Fish | ................... | G06F 17/30864 |
| 2006/0026145 A1 * | 2/2006 | Beringer | ............... | G06F 3/0482 |
| 2008/0152231 A1 * | 6/2008 | Gokturk | ............ | G06F 17/30256 382/209 |
| 2012/0254720 A1 * | 10/2012 | Hamm | .............. | G06F 17/30899 715/234 |
| 2014/0025672 A1 * | 1/2014 | Zhang | ................. | G06F 17/3053 707/728 |

* cited by examiner

*Primary Examiner* — Anil Bhargava

(57) ABSTRACT

There is provided a method for dynamically updating a set of data objects, comprising: managing an object dataset defining attribute values for attribute parameters for each object; receiving a query including search term(s); applying the query to the object dataset to select a first set of objects including attribute parameter(s) associated with the search term(s); instructing rendering of the first set of objects within a graphical user interface (GUI); receiving a selection of object(s) of the first set of objects; identifying attribute parameter(s) according to the selected object(s); excluding a second set of objects from the first set of objects based on different attribute values of the identified attribute parameter(s), to identify a third set of objects; and instructing dynamic rendering to update the GUI to present the third set of objects, wherein the third set of objects includes fewer members than the first set of objects.

17 Claims, 10 Drawing Sheets

SYSTEMS AND METHODS FOR NAVIGATING A SET OF DATA OBJECTS

RELATED APPLICATION

This application is related to co-filed application titled "MULTIVARIABLE OBJECTS NAVIGATION TOOL" having Ser. No. 14/882,689, by at least some of the same inventors, and assigned to the same entity. The co-filed application relates to a differentiating feature, which may be used (e.g., attribute parameter) as a basis for exclusion of object(s), as described herein.

BACKGROUND

The present invention, in some embodiments thereof, relates to systems and methods for management of object datasets and, more specifically, but not exclusively, to systems and methods for rending instructions to dynamically update a graphical user interface (GUI) to present a subset of the object dataset.

Searching for one or more objects within an object dataset, for example, products or services, may be performed using different methods. For example, a user searching for a book on patent filing at an online book store may encounter thousands of matches. In one method, the user enters additional key words. Objects matching the set of entered key words are presented, such as by sorting the entire list to identify the best matched object. For example, a user looking for a book on how to file a patent without an attorney may enter the words 'patent filing USPTO inventor without attorney' to try and find the desired book. In another example, the user may sort the entire list to identify the top matches. For example, the user may sort the list of books by publication data, to find the newest book.

SUMMARY

According to an aspect of some embodiments of the present invention, there is provided a computer-implemented method for dynamically updating a set of data objects within a graphical user interface presented on a display of a client terminal according to manual user input provided using a physical user interface of the client terminal, comprising: managing an object dataset defining a plurality of attribute values for attribute parameters for each object; receiving a query including at least one search term; applying the query to the object dataset to select a first set of objects including at least one attribute parameter associated with the at least one search term; instructing rendering of the first set of objects within a graphical user interface (GUI) for presentation on a display of a client terminal; receiving a selection of at least one object of the first set of objects, the selection performed by a user using a physical user interface in communication with the client terminal; identifying at least one attribute parameter of the plurality of attribute parameters according to the selected at least one object; excluding a second set of objects from the first set of objects based on different attribute values of the identified at least one attribute parameter, to identify a third set of objects; and instructing dynamic rendering to update the GUI to present the third set of objects, wherein the third set of objects includes fewer members than the first set of objects.

Optionally, the selection of the at least one object is performed by the user using a single selection maneuver, and the update of the GUI to present the third set of objects is executed in response to the single selection maneuver.

Optionally, the identified at least one attribute parameter are added as at least one excluding term to the query.

Optionally, the identified at least one attribute parameter includes at least one differentiating feature that most differentiates the selected at least one object from other objects of the first set.

Optionally, the method further comprises dynamically creating an object filter according to the different attribute values of the identified at least one attribute parameter, and wherein excluding the second set of object to identify the third set of objects comprises applying the dynamically created object filter to the first set of objects.

Optionally, excluding comprises excluding the second set of objects based on different attribute values of the indentified at least one attribute parameter within a similarity requirement, wherein the similarity requirement is selected to include a family of objects similar to the selected at least one object serving as an example of the family of objects.

Optionally, identifying at least one attribute parameter of the plurality of attribute parameters is performed according to a ranking of attribute parameters having values that are most different between the selected at least one object and other objects of the first set.

Optionally, identifying at least one attribute parameter of the plurality of attribute parameters is performed according to a ranking of attribute parameters having values that are most similar between the selected at least one object and other objects of the first set.

Optionally, the method is iterated, by repeating the method substituting the third set of objects for the first set of objects.

Optionally, the method further comprises instructing rendering of a GUI on the display to present options for selection of the at least one attribute parameter of the plurality of attribute parameters, and receiving the selection of the at least one attribute parameter from by a user using a physical user interface in communication with the client terminal.

Optionally, the method further comprises calculating a similarity value between the identified at least one object and each member of the first set of objects; wherein the similarity value is calculated based on all or a subset of values of the identified at least one attribute parameter; identifying the second set of objects according to a difference requirement applied to the calculated requirement values; and wherein excluding the second set of objects from the first set of objects comprises excluding the identified second set of objects from the first set of objects. Optionally, calculating the similarity value comprises calculating a weighted average of the differences between all or the subset of values of the identified at least one attribute parameter.

Optionally, the identifying at least one attribute parameter of the plurality of attribute parameters is performed according to at least one member selected from the group consisting of: a ranking of weights assigned to each attribute parameter of the selected at least one object, a ranking of most popular attributes manually selected by other users, a ranking of attribute selections performed by the current user according to a history of previous actions; and a ranking of a number of other objects excluded by the at least one attribute parameter.

Optionally, the object represents a physical product or service. Optionally, the attribute parameters define characteristics of the physical product or service, selected from the group consisting of: price, brand, model, and component size.

According to an aspect of some embodiments of the present invention, there is provided a system for dynamically updating a set of data objects within a graphical user interface presented on a display of a client terminal according to manual user input provided using a physical user interface of the client terminal, comprising: a network interface for communicating over a network with a plurality of client terminals each associated with a display and at least one physical user interface; a data repository storing an object dataset defining a plurality of attribute values for attribute parameters for each object; a program store storing code; and a processor coupled to the network interface, the data repository, and the program store for implementing the stored code, the code comprising: code to receive a query including at least one search term, and apply the query to the object dataset to select a first set of objects including at least one attribute parameter associated with the at least one search term; code to generate instructions to render the first set of objects within a graphical user interface (GUI) for presentation on a certain display of a certain client terminal; code to receive a selection of at least one object of the first set of objects, the selection performed by a user using a physical user interface in communication with the certain client terminal; code to identify at least one attribute parameter of the plurality of attribute parameters according to the selected at least one object, and exclude a second set of objects from the first set of objects based on different attribute values of the identified at least one attribute parameter, to identify a third set of objects; and code to generate instruction to dynamically render an update to the GUI to present the third set of objects, wherein the third set of objects includes fewer members than the first set of objects.

Optionally, the certain client terminal is a smartphone having limited space of the display, and wherein the identifying at least one attribute parameter is selected to sufficiently exclude the second set of objects such that members of the third set of objects fit on the limited space of the display.

According to an aspect of some embodiments of the present invention, there is provided a non-transitory computer readable storage medium dynamically updating a set of data objects within a graphical user interface presented on a display of a client terminal according to manual user input provided using a physical user interface of the client terminal, comprising instructions stored thereon, that when executed on a processor of a server in network communication with a plurality of client terminal perform the steps of: managing an object dataset defining a plurality of attribute values for attribute parameters for each object; receiving a query including at least one search term; applying the query to the object dataset to select a first set of objects including at least one attribute parameter associated with the at least one search term; instructing rendering of the first set of objects within a graphical user interface (GUI) for presentation on a display of a client terminal; receiving a selection of at least one object of the first set of objects, the selection performed by a user using a physical user interface in communication with the client terminal; identifying at least one attribute parameter of the plurality of attribute parameters according to the selected at least one object; excluding a second set of objects from the first set of objects based on different attribute values of the identified at least one attribute parameter, to identify a third set of objects; and instructing dynamic rendering to update the GUI to present the third set of objects, wherein the third set of objects includes fewer members than the first set of objects.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
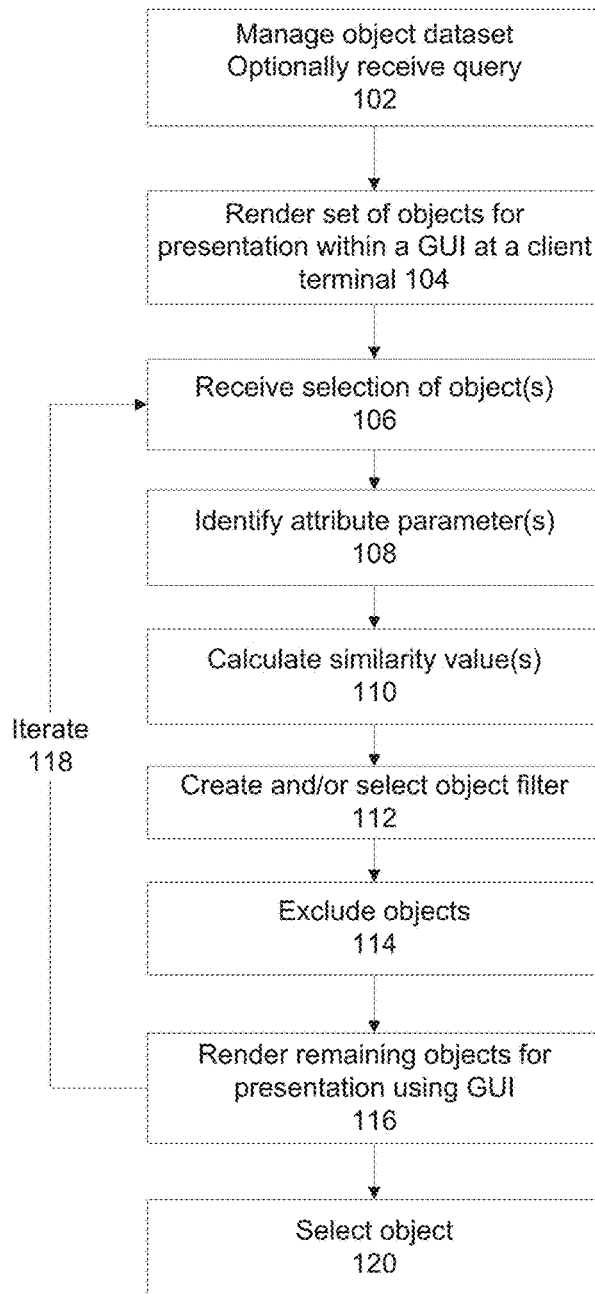
FIG. 1 is a flowchart of a process for navigating a set of data objects within a GUI by exclusion of one or more objects, in accordance with some embodiments of the present invention.

The present invention, in some embodiments thereof, relates to systems and methods for management of object datasets and, more specifically, but not exclusively, to systems and methods for rending instructions to dynamically update a graphical user interface (GUI) to present a subset of the object dataset.

An aspect of some embodiments of the present invention relates to systems and/or methods (e.g., code implementable by a server in communication with client terminals) for dynamically updating data objects within a GUI presented on a display of a client terminal according to a user selection manually made using a physical user interface (e.g., touch screen) associated with the client terminal. A search query (e.g., based on manual user input) is applied to an object dataset to select a set of data objects according to one or more search terms of the query, for example, by matching attribute parameters of the objects to the terms. A first sub-set of data objects is excluded from the set of data objects according to the user selection (e.g., the user clicks or touches an icon representing one of the objects), to generate a second sub-set of data objects. The second sub-set of data objects is presented on the display within the GUI. In this manner, the set of data objects for presentation within the GUI is reduced based on the user selection by excluding data objects from the set of objects selected according to the search query. In other words, the user may select a set of objects from the dataset by inclusion of the terms of the search query, and then exclude a sub-set of objects from the selected set.

The systems and/or methods described herein provide a technical solution to the technical problem of improving a GUI for navigating large sets of data objects, by allowing (e.g., a user) to add one or more excluding terms to a search query based on a single selection, for example, a single click or touch (e.g., of an icon representing a data object). Using the single click, multiple features may be excluded. For example, when the user selects a data object using the single click, attribute values of attribute parameters of the selected data objects may be automatically identified as features and added as exclusion terms to the search query.

Optionally, the feature(s) used to exclude data objects (e.g., attribute values and/or attribute parameters) are differentiating feature(s), namely the feature of the selected object (e.g., product) that differentiates the selected object most from the other objects, as described with reference to co-filed application having Ser. No. 14/882,689, incorporated herein by reference in its entirety.

Each object of the object dataset is associated with attribute values assigned to attribute parameters. The attribute parameters defined different characteristics of the object. The attribute values defined the actual value assigned to each attribute parameter associated with the object. The data objects may represent physical data objects, for example, products and/or services. The attribute parameters may include characteristics defining the products and/or services, for example, price, brand, size of component (e.g., laptop screen size), and sub-type (e.g., tablet computer or laptop). The user may search through the set of products and/or services using the systems and/or methods described herein to reduce the set of available products and/or services to help select the desired product and/or service.

Optionally, object members of the excluded sub-set of are statistically similar to the user selected object. The user may select an object that is representative (e.g., serves as an example) of a family of objects that the user wishes to exclude. The statistical similarity may be calculated based on values of selected attribute parameters (e.g., selected by the user, and/or automatically by software, such as based on user popularity). The statistical similarity may be calculated based on values of all attribute parameters associated with each object. Optionally, the statistical similarity is determined according to a calculated similarity value compared to a similarity requirement (e.g., a range, a threshold, matching a Boolean value and/or string). The calculated similarity value may be a calculated correlation, a weighted average of the distance between attribute parameters, and/or other methods.

The method of selecting an object, excluding similar objects from the set of objects, and presenting the remaining objects within a GUI on the display may be iterated, by the user selecting another object from the presented sub-set of objects, and presenting the remaining objects after exclusion of similar objects from the sub-set. In this manner, the user may iteratively exclude undesired objects to reach a set of desired objects. Optionally, the method is iterated until the remaining set of objects fits within the available space on the display presenting the GUI.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
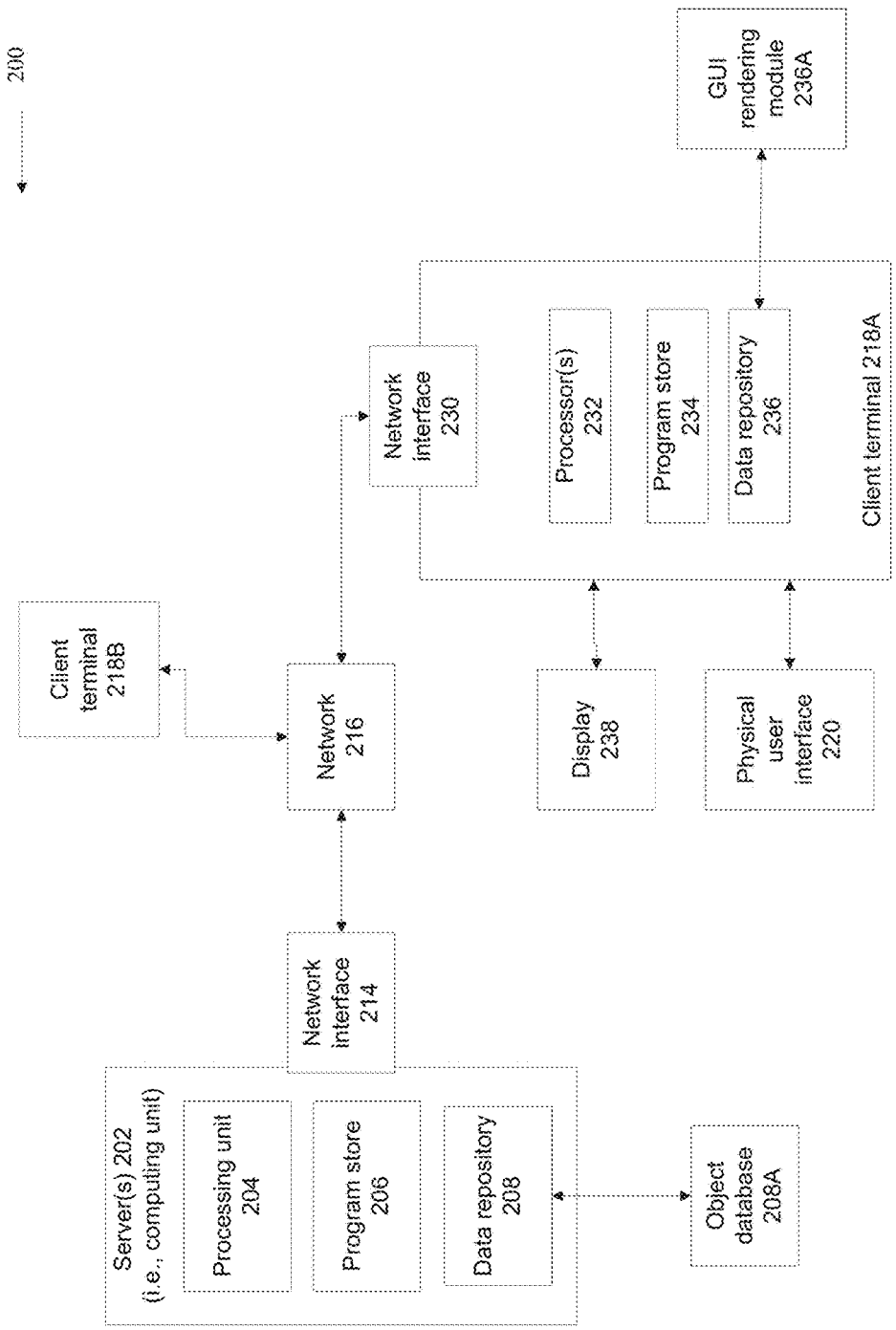
FIG. 2 is a block diagram of components of a system for navigating a set of data objects within a GUI by exclusion of one or more objects, in accordance with some embodiments of the present invention.

Reference is now made to FIG. 1, which is a flowchart of a process for navigating a set of data objects within a GUI by exclusion of one or more objects from the set and presenting at least some of the remaining objects within the GUI, in accordance with some embodiments of the present invention. Reference is also made to FIG. 2, which is a block diagram of components of a system 200 that allows a user to navigate a set of data objects presented by a GUI by exclusion of one or more objects from the set, and presenting at least some of the remaining objects within the GUI, in accordance with some embodiments of the present invention. The systems and/or methods described herein may perform the exclusion based on identifying one or more objects that are similar to a selected data object(s) (e.g., user selected object). The identified objects are excluded from the GUI presented objects. In this manner, the user may navigate the data objects by excluding groups of objects that are not desired, to arrive at a set of data objects that contains desirable objects. The process of FIG. 1 may be executed by the system of FIG. 2.

The systems and/or methods described herein address the technical problem of improving a GUI for navigating large sets of data objects. The large set may contain a large number of member objects, for example, in the hundreds, thousands, tens of thousands, hundreds of thousands, and millions. The members of the large set cannot all be presented within a limited screen space, and scrolling through a large number of objects is burdensome and unmanageable. The systems and/or methods described herein provide an interactive GUI that allows a user to exclude objects from the set, and presenting the remaining non-excluded data objects. The exclusion may be performed by identifying data objects that are similar to a selected data object (e.g., user selected), optionally based on a calculated similarity of one or more attribute values assigned to attribute parameters. The GUI is presented on a physical user interface, such as a display, optionally a touch-screen. The user enters data using a physical user interface, which may be the touch-screen, or a keyboard, mouse, or other physical device. The exclusion may be performed by a server in communication with a client terminal using the GUI to access the object dataset.

The systems and/or methods described herein may improve performance of a computing system, such as a client terminal, network, and/or server, for example, by reducing processor utilization, reducing data traffic over the network, and/or by reducing storage requirements. Improvements may occur, for example, by the exclusion of objects from the presented set of data objects according to real-time user selection of a data objects used as a basis for identification of the objects for exclusion, as compared to, for example, the user manually scrolling through a large number of data objects, and/or the user repeating search queries with increasingly narrow terms to reduce the size of the presented set of objects.

The systems and/or methods described herein may generate new data (which may be presented to the user on the GUI, stored, and/or transmitted to another server) that includes a reduced set of data objects that exclude other objects. The new data may include one or more calculated similarity metrics, that define the similarity between a user selected objects and other excluded objects according to one or more identified attributes of the objects. The user may adjust a difference requirement used to exclude the objects according to the related similarity metric. For example, on a scale of 0-1, where 0 is very different and 1 is identical, and using a cutoff of 0.8, very similar objects (e.g., 0.9) may be excluded, while somewhat similar objects may remain (e.g., 0.7).

Accordingly, the systems and/or methods described herein are necessarily rooted in computer technology to overcome a problem arising in GUI.

System 200 includes a computing unit 202, for example, a server, optionally a web server. Computing unit 202 includes a processing unit(s) 204, for example, a central processing unit(s) (CPU), a graphics processing unit(s) (GPU), field programmable gate array(s) (FPGA), digital signal processor(s) (DSP), and application specific integrated circuit(s) (ASIC). Processing unit 204 may include one or more processors (homogenous or heterogeneous), which may be arranged for parallel processing, as clusters and/or as one or more multi core processing units.

Computing unit 202 may communicate with clients 218A-B, for example, by providing software as a service (SaaS) to clients 218A-B, providing an application that performs rendering (as described herein) for local download to clients 218A-B, and/or providing functions using a remote access session to client 218A-B such as through a web browser.

Computing unit 202 includes a network interface 214 for communication with clients 218A-B over a network 216, for example, the internet, a private network, a cellular network, a wireless network, a local area network, or other networks.

It is understood that two clients 218A-B are shown for clarity, but server 202 may communicate with a large number of clients, such as according to server processing capabilities and/or network capabilities.

Clients 218A-B include, for example, a mobile device, a smartphone, a tablet computer, a desktop computer, a notebook computer, a wearable computer, a watch computer, a glasses computer, and/or a computer at a kiosk. Each client 218A-B includes a network interface 230 for connecting to server 202 using network 216. Each client 218A-B includes a computing unit 232 (e.g., processor) for implementing code stored in program store 234 (e.g., local memory, a hard drive, a removable storage device, access to a remote storage unit). Client terminals 218A-B may include a data repository 236 (e.g., local memory, a hard drive, a removable storage device, access to a remote storage unit) that stores, for example, a GUI rendering module 236A that renders the GUI according to instructions provided by server 202. Client terminals 218A-B include or are in communication with a display 238 (e.g., screen, touch-screen) and/or a physical user interface 220 (e.g., touch-screen, keyboard, microphone with voice activation software, mouse, touchpad). It is noted that computing unit 202 may be associated with physical user interface 220, for example, as a thin client, a kiosk, or a web browser.

Computing unit 202 includes a program store 206 storing code implementable by processing unit 204, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Computing unit 202 may include multiple computers (having heterogeneous or homogenous architectures), which may be arranged for distributed processing, such as in clusters.

Computing unit 202 includes a data repository 208 storing database(s), and/or other data items. Data repository 208 may include or be associated with an object database 208A that stores representations of, for example, physical objects (e.g., products), virtual objects (e.g., software products, such as online books, games, accounting software, and security products), and/or services (e.g., vacation packages, car garage services, and dental service). Object database 208A may be stored, for example, as tables, as linked tables, as databases, using a document based method that stores entire objects, using a key-value based method, or other methods.

The interactive GUI (as described herein) may be presented on physical user interface 220, for example, within a web browser.

The acts of the method of FIG. 1 may be implemented by the processor of the server, and/or by the processor of the client terminal, respectively implementing code stored in the program store.

At 102, an object dataset defining attribute values for attribute parameters for each object of the dataset is managed. The object dataset may be managed by the server. The object dataset may be stored in association with the server, for example, on a local and/or remote storage device, for example, as object dataset 208A described herein.

The object dataset may represent a physical and/or virtual product and/or service, for example, an online administrative assistant, a virtual book to download, a shirt available for purchase, software as a service (e.g., security products to protect the client terminal), and a car washing service. The object dataset may represent products and/or services available for purchase, online, and/or at a physical location.

Each object of the dataset is associated with multiple attribute parameters, some or all of which may be assigned attribute values. The attribute parameters define characteristics of the object, optionally of the corresponding physical and/or virtual product and/or service. Examples of attribute parameters include: price, brand, model, and associated components, such as component size. Examples of attribute values for the attribute parameters include: price=$700, brand=SONY®, model=JVX7632, component size=screen size 17 inch.

Optionally, a query is received. The query may include at least one search term, for example, a manually entered text keyword, and/or a selection of a category from a list of predefined categories. The query is applied to the object dataset, to select a set of objects. The set of objects may be selected according to an association between attribute parameter(s) and/or attribute values of the objects and the search terms. For example, the object dataset may include products available for purchase in an online electronics store, and the query is for a LAPTOP. The set of objects identified from the object dataset includes the available laptops. For example, objects having the attribute parameter and/or attribute value LAPTOP are selected.

The query may be entered by the user, using the physical user interface to enter the query into the GUI, for example, using a web browser accessing a webpage hosted by the server, in communication with the object dataset. The query may be automatically generated by code, for example, by code that analyzes usage patterns of a user browsing the web, and generates the query based on topics that might be of interest to a user (e.g., using a statistical classifier).

At 104, instructions are created to render the set of objects from the object dataset (e.g., the set identified by applying the query, as described with reference to block 102) within a GUI for presentation on a display of a client terminal. The instructions may be created by the server, optionally in response to the user accessing the object dataset and/or in response to the query applied to the object dataset. The instructions may be transmitted by the server to the client terminal over the network, for example, as packets and/or other network messages.

The instructions may be locally rendered, for example, by the GUI rendering module stored in association with the client terminal, and/or by a web browser, and/or by another GUI program.

The instructions may include a reduced dataset mapped (or otherwise linked) to the identified objects of the database. The reduced dataset may include the objects that may be displayed on the screen, such as to reduce the amount of data transmitted over the network.

The instructions may include, for example, a script, hypertext (e.g., hypertext markup language (HTML)), cascading style sheets (CSS), compiled code for execution by the processor of the client terminal, and/or code for compilation by the client terminal.

At 106, a selection of one or more objects of the GUI presented set of objects is received. The selection may be performed by the user using the physical user interface in communication with the GUI of the client terminal, for example, by touching the data object on a touch screen, or by clicking the data object using a mouse.

The selection of the object may be performed (e.g., by the user) using a single selection maneuver, for example, a single click (e.g., click using a mouse when a cursor is positioned over an icon representing the object) or a single touch (e.g., touching the location of a touch-screen displaying the icon).

A message indicative of the user selection may be locally processed and/or transmitted to the server over the network (e.g., as packets and/or other network messages) for processing by the server.

At 108, one or more attribute parameters are identified. The identified attribute parameters serve as a basis for identifying the data objects for exclusion from the set of presented objects, as discussed in greater detail herein.

The attribute identification may be performed automatically by code implemented by a processor, and/or manually by a user.

Optionally, instructions are created (e.g., by the server and/or by the client terminal, such as a script and/or hypertext) to render the GUI on the display to present options for selection of the attribute parameter by the user. The rendered GUI allows the user to perform the selection of the attribute parameter using the physical user interface, for example, pressing a touch-screen at locations corresponding to the desired attribute parameters. The rendered GUI may access an interface to transmit the selection to the server.

Optionally, the user selects one or more attribute parameters. Optionally, the attribute parameters are be selected from a general list of the available attribute parameters associated with the presented set of objects, for example, by clicking on the desired attribute parameters from the list of attribute parameters. It is noted that different objects, such as of different types, may have different attribute parameters. The list may include the common attribute parameters (e.g., intersection of the parameters) and/or the different attribute parameters within the set (e.g., union of the parameters). For example, when the presented objects include laptops (which may have a CD-ROM drive) and smartphones (which do not have a CD-ROM drive), the attribute parameters may or may not include CD-ROM type. Alternatively, the attributes are automatically identified by software, for example, based on predefined settings. The software may automatically identify the union or the intersection of the attributes from the set of objects.

Alternatively or additionally, the attribute parameters are selected from a list of attributes associated with the selected object(s), for example, by clicking on the desired attribute parameters from the list of attribute parameters of the selected object. For example, when the user selects a certain laptop from the presented object set, the user may select from the attributes associated with the selected laptop, for example, price, brand, color, hard disk space, available memory, and screen size. When the user selects two or more objects, the list of attributes may include the union of the attribute parameters of the selected objects or the intersection of the attribute parameters of the selected object. Alternatively, the attributes are automatically identified by software, for example, based on predefined settings. The software may automatically identify the union or the intersection of the attributes from the set of selected objects.

Alternatively, all attributes are automatically identified, for example, by a software definition. The attributes that are automatically identified may include the attributes of the selected object, and/or the attributes of the presented list (e.g., union thereof or intersection thereof).

Optionally, the attribute parameter(s) are identified according to a ranking of the attribute parameters having values that are most different between the selected object(s) and other objects of the presented set of objects. The difference may be calculated, for example, as an absolute value when the attribute values are numbers, for example, greatest differences in price. The difference may be determined as a binary value, for example, difference or same, such as when the attribute values are Boolean variables, strings, or values defined by a set, for example, whether the color is the same or not.

Alternatively, the attribute parameter(s) are identified according to a ranking of the attribute parameters having values that are most similar between the selected object(s) and other objects of the presented set of objects. The similarity (or difference) may be calculated, for example, as an absolute value when the attribute values are numbers, for example, smallest differences in price. The similarity (or difference) may be determined as a binary value, for example, difference or same, such as when the attribute values are Boolean variables, strings, or values defined by a set, for example, whether the color is the same or not.

The identification may be performed manually by the user, such as presenting the ranked list to the user for selection, and/or automatically by code, for example, selecting the top ranking predefined number of attributes parameters (or using other selection methods).

Other methods of identifying attribute parameters include:
  Calculating a ranking of the attributes based on weights assigned to each attribute parameter (optionally of the selected object).
  Calculating a ranking of the most popular attributes manually selected by other users.
  Calculating a ranking of attribute selections performed by the current user according to a history of previous actions (e.g., logged by the server and/or by the client terminal).
  Calculating a ranking of a number of other objects excluded by the at least one attribute parameter. For example, the attribute parameter that identifies the greatest number of objects for exclusion is ranked first.

Alternatively or additionally, the identified attribute parameter includes one or more differentiating features that most differentiate the selected object from the other objects of the set. Details of the differentiating feature are described with reference to the co-filed application having Ser. No. 14/882,689, incorporated herein by reference in its entirety.

At 110, a similarity value(s) may be calculated between the selected object(s) and each member of the first set of objects. The similarity value may be calculated based on values of the identified attribute parameters (as described with reference to block 108). The similarity value may be calculated based on a subset of the identified attribute parameters (e.g., calculations may be omitted in the case where one object includes the attribute parameter and another object does not). The similarity value may be calculated by the server and/or by the client terminal.

Optionally, the similarity value is calculated per attribute parameter. A set of similarity values may be calculated between the selected object and a member of the set of presented objects. For example, when the attributes include price, model, and screen size, a similarity value may be calculated per attribute parameter. Alternatively, the similarity value is calculated for the set of attribute parameters associated with the object(s), such as a single similarity value. The similarity value may be calculated as a weighted average of the differences between all or the subset of values of the identified attribute parameters, for example, the similarity value may be calculated as a weighted average of sub-similarity values calculated for each attribute parameter.

The similarity value may be calculated using one or a combination of methods, for example:
- Calculating the absolute value of the difference in attribute values between attribute parameters of the objects being compared (e.g., the selected object and each member of the set of presented objects).
- Calculating a binary value representing whether the attribute values match or not.
- Calculating a statistical distance between attribute values of the attribute parameters. The statistical distance may be calculated as a single value for multiple identified parameters, for example, as a vector distance.
- Calculating a correlation value representing the degree of similarity between the attribute values of the attribute parameters, per parameter or simultaneously for multiple parameters. For example, on a scale of 0-1, where 0 represents completely different attribute values and 1 represents identical attribute values.

At 112, an object filter may be dynamically created for exclusion of objects from the set of objects. The object filter may be created, optionally in real-time, by the server and/or by the client terminal. Alternatively, a set of object filters are stored (e.g., on a storage unit in association with the server). The object filter to apply may be selected from the stored set of filters.

The object filter may be created according to the identified attribute parameters. Optionally, the object filter is designed to exclude objects that have attribute values that are similar or the same as the attribute values of the selected object.

The object filter may be implemented as a narrowed query (e.g., of the search query of block 102) by adding exclusion terms to the search query. The exclusion terms define the objects to exclude from the set of objects when the query is applied. The exclusion terms may be based on one or more of: the identified attribute parameter(s), attribute value(s), similarity value(s), and/or similarity requirement(s).

The object filter may be created according to the calculated similarity value (e.g., as described with reference to block 110). Optionally, the object filter is created based on a similarity (or difference) requirement, for example, a range, a threshold, and/or a function. The requirement may be static (e.g., manually selected by the user and/or pre-defined by system settings) and/or dynamic. Examples of dynamic requirements include: based on the number of objects that the screen can display simultaneously, and based on the current most population attribute values. The dynamic requirement may be calculated in real-time, or iteratively arrived at, for example, by testing different requirements to obtain the desired requirement fulfilling the function.

Optionally, the similarity requirement is selected (and/or calculated) to include a family of objects similar to the selected object, optionally according to the identified attribute parameters. In this manner, the selected object serves as an example of the family of objects for exclusion. The similarity requirement may be selected, for example, to include attribute values of other similar objects within the object family of the selected object. For example, when the set of objects includes laptops, smartphones, and wearable computers, and the user selects a certain laptop (e.g., having the attribute values of: a $700 price, black color, and 14 inch screen), the object family may include all laptops, all laptops in the $700 range, all black laptops, and/or all laptops with 14 inch screens (i.e., depending on the identified attribute parameters). As such, if the user selected a $700 orange color 13 inch screen laptop, the same or similar group of objects may be excluded, according to the identified attribute parameters and/or similarity requirement.

The user may dynamically adjust the requirement in real-time, for example, using a graphical widget that may be part of the GUI, for example, a slide that allows the user to change the requirement threshold within defined limits.

Examples of requirements include: a cutoff value between 0-1 (where 0 represents completely different attribute values and 1 represents identical values), a range within 0-1, and/or a function (e.g., exclude objects until 5 are left).

The object filter may be represented, for example, as a script, as code, as a database query, as a function, and/or other instructions for implementation by the processor.

At 114, a set of objects (referred to herein as the excluded set) is excluded from the set of objects (e.g., the presented set of objects discussed with reference to block 104). The exclusion provides a remaining set of objects. The remaining set of objects may be presented within the GUI, for navigation by the user. The remaining set of objects includes a smaller number of objects than the original presented set of objects. The remaining objects may be more desirable to the user, since the undesired objects have been excluded.

The exclusion may be performed by applying the created object filter (as discussed with reference to block 112) to the set of objects (e.g., the presented set of objects discussed with reference to block 104).

The remaining set of objects may have different attribute values than the excluded set, optionally according to the similarity requirement (e.g., as discussed with reference to blocks 110-112).

It is noted that alternatively or additionally, in some implementations, the identified attribute parameters and/or similarity value(s) and/or similarity requirement(s) may be used to select objects, in addition to, or instead of, excluding the objects. For example, the filter may be used to select objects for presentation to the user, rather than selection of objects for exclusion. In such implementations, the user may be presented with an option (e.g., using the GUI) to exclude the similar objects, or to select the similar objects. In such implementations, the user may be provided with the option to exclude similar non-desired objects and/or to include desired similar objects.

At 116, instructions are created to dynamically render and/or update the GUI to present the set of remaining objects. The instructions may be created by the server (and transmitted to the client terminal) and/or at the client terminal.

The set of remaining objects includes fewer members than the previous (i.e., prior to exclusion) set of objects. The fewer objects may be more manageable to a user, allowing easier navigation of the objects within the GUI, and/or improved presentation of the objects on the display by the GUI.

At 118, one or more of blocks 106-116 may be iterated. The iteration may be performed by repeating one or more of blocks 106-116 by substituting the current set of remaining objects for the previous set of objects (i.e., prior to exclusion). In this manner, the user may select another object(s) from the set of remaining objects to be used as a basis for exclusion of another set of objects. The method may be iterated one or more times, each time excluding another set of objects, until, for example, the user arrives at a desired set of objects from which the user makes a final selection (i.e. block 120).

At 120, the user makes a final selection from the remaining set of objects (one or more of which are presented using the GUI). For example, the user may select the object for purchase, may save the object (e.g., for future reference), and/or may stop selection of additional objects for exclusion.

Figure 3:
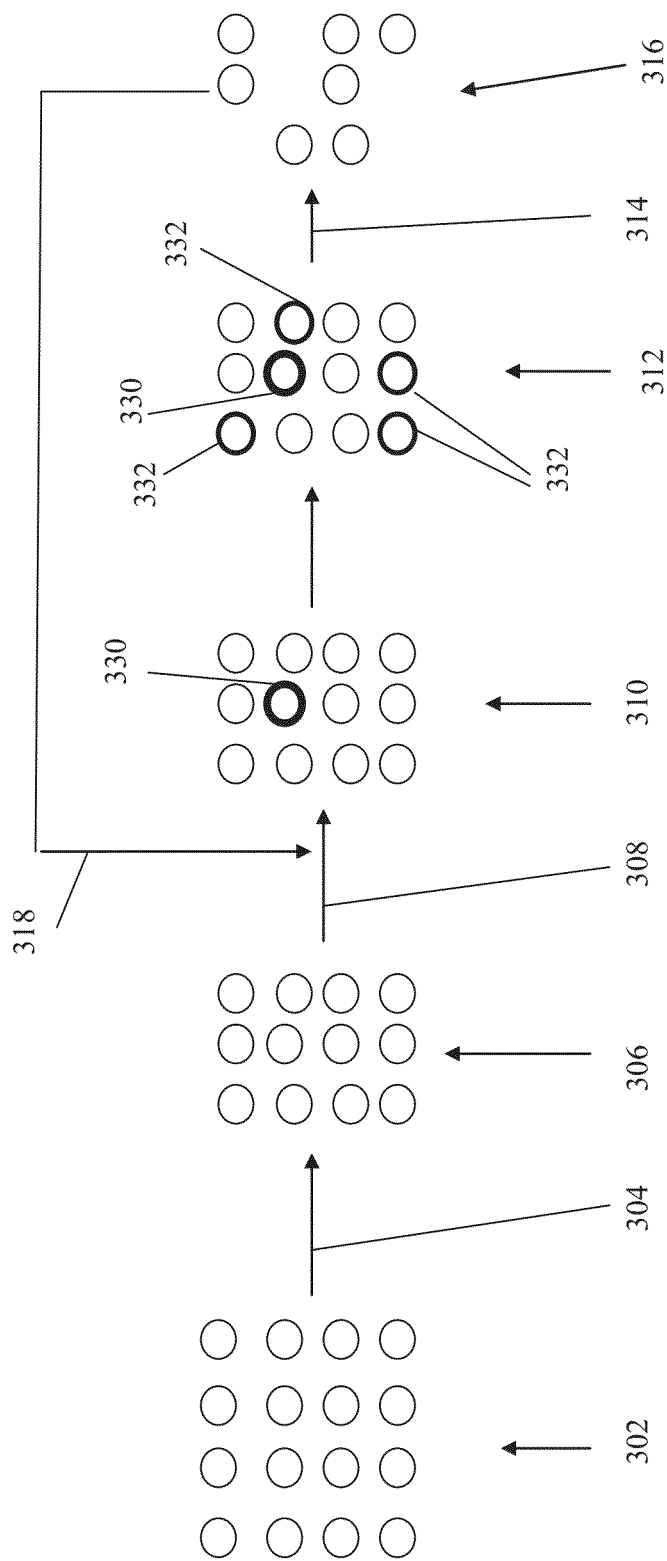
FIG. 3 is a schematic of an exemplary implementation depicting exclusion of data object(s) that are similar to an object(s) selected from a set of objects, in accordance with some embodiments of the present invention.

Reference is now made to FIG. 3, which is a schematic of an exemplary implementation depicting exclusion of data object(s) that are similar to an object(s) selected from a set of objects, in accordance with some embodiments of the present invention. The schematic of FIG. 3 represents an implementation according to the process of FIG. 1, and/or the system of FIG. 2.

At 302, an object dataset (each object being associated with multiple attribute values assigned to attribute parameters) is managed, for example, by a server managing the dataset stored on a storage device, for example as discussed with reference to block 102 of FIG. 1.

At 304, a query, such as one or more search terms (e.g., entered by a user using an interface of a client terminal) is received by the server. The query is implemented (e.g., by the server) to identify a set of objects from the object dataset, for example, by applying the terms using a search engine. For example as discussed with reference to block 102 of FIG. 1.

At 306, the set of objects is presented to the user, for example, a GUI implemented on the client terminal receives instructions from the server to render the set of objects (or portion thereof) for presentation on a display. For example as discussed with reference to block 104 of FIG. 1.

At 308, the user selects an object, for example, by touching the object on a touch screen. For example as discussed with reference to block 106 of FIG. 1.

At 310, attribute parameters are identified according to the selected object 330 (e.g., by the server). For example as discussed with reference to block 108 of FIG. 1.

At 312, one or more objects 332 that are similar to the user identified object 330 are identified according to the identified attribute and/or according to calculated similarity value(s) in view of similarity requirement(s). For example as discussed with reference to blocks 110 of FIG. 1. Alternatively or additionally, a filter may be dynamically created (or selected from a set of pre-defined filters) according to the identified attributes and/or according to the calculated similarity value(s) in view of the similarity requirement(s). For example as discussed with reference to block 112 of FIG. 1.

At 314, objects similar to the selected object are excluded from the set of objects. The dynamic object filter may be applied to the set of objects, and/or the identified similar objects may be excluded. For example as discussed with reference to block 114 of FIG. 1.

At 316, the remaining objects (i.e., after exclusion of objects) are presented in a GUI on the display, optionally based on instructions to render the remaining objects received from the server. For example as discussed with reference to block 116 of FIG. 1.

At 318, the user may select another object that is used as a basis for exclusion of another group of similar objects. For example as discussed with reference to block 118 of FIG. 1. Alternatively, the user may make a final selection from the presented remaining objects. For example as discussed with reference to block 120 of FIG. 1.

Figure 4:
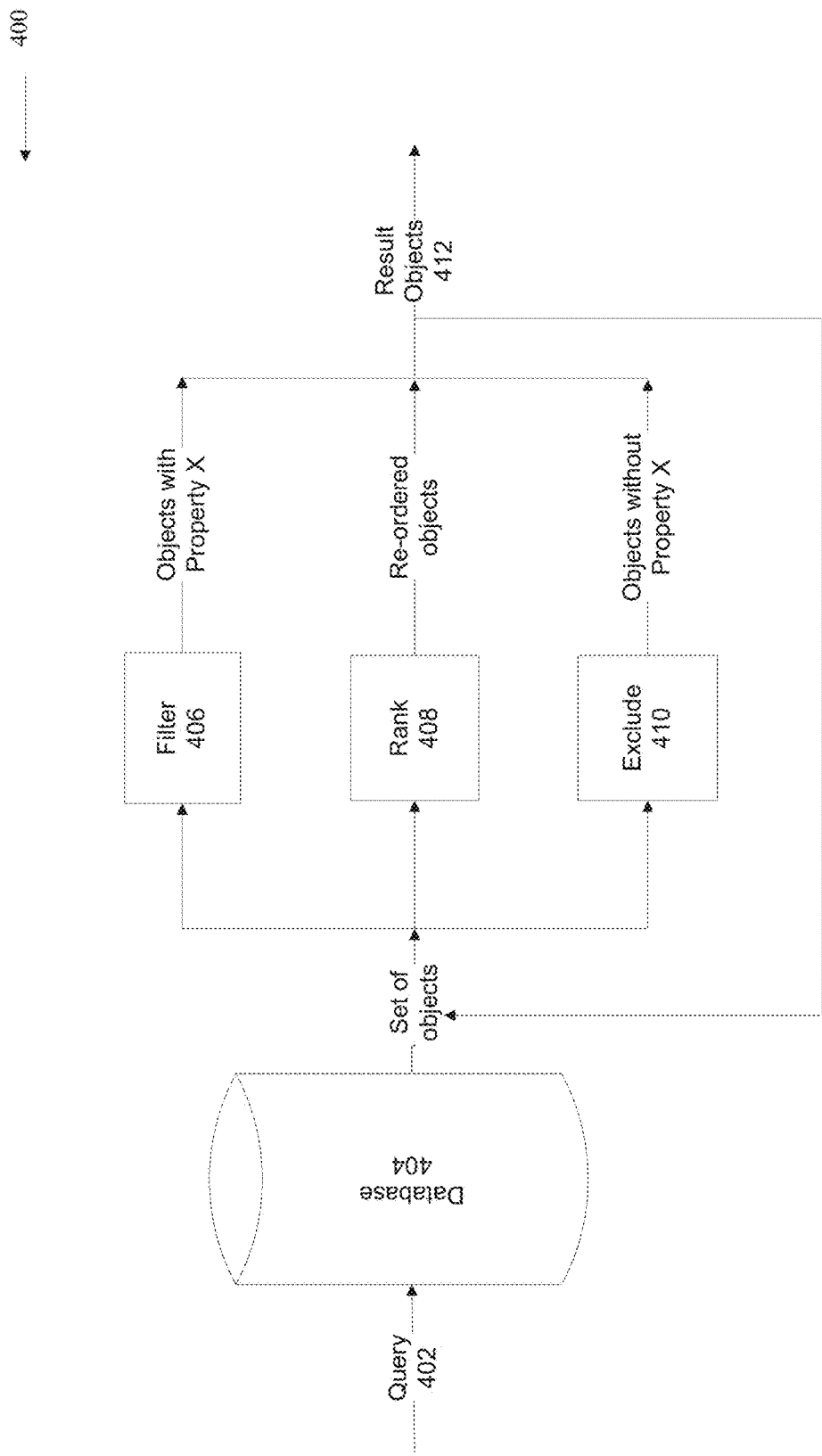
FIG. 4 is a block diagram depicting dataflow in an exemplary process that excludes objects based on a selected object, in accordance with some embodiments of the present invention.

Reference is made to FIG. 4, which is a block diagram depicting an exemplary dataflow 400 in a process that excludes objects based on a selected object, in accordance with some embodiments of the present invention. A query 402 is applied to a database of objects 404 to generate a set of objects (e.g., as discussed with reference to blocks 102-104 of FIG. 1). The user may select one or more objects from the set of objects (e.g., as in block 106). One or more attribute parameters may be identified and/or similarity values may be calculated based on the selected object(s) (e.g., as in blocks 108-110).

Optionally, at 406, a filter (which may be created and/or selected as in block 112) is applied to the set of objects to create another set of objects that include objects with the identified attribute parameters. It is noted that in such an implementation, the user selects similar objects to keep (i.e., rather than exclude, for example, as discussed with reference to block 114). Alternatively or additionally, at 408, the set of objects are re-ordered according to a ranking based on the identified attribute parameters and/or calculated similarity values, for example, ranked according to decreasing attribute vales and/or increasing similarity values. The GUI may be dynamically updated with the new order. Alternatively or additionally, at 410, objects are excluded according to the identified attribute parameters and/or similarity value (e.g. as in block 114).

At 412, the resulting set of objects is rendered for presentation on the display of the client terminal within the GUI. The process may be iterated by another selection of the user and/or another ranking of the set of objects. Alternatively, the user may make a final selection to terminal the process, for example, select one of the objects for purchase or final approval.

Figure 5:
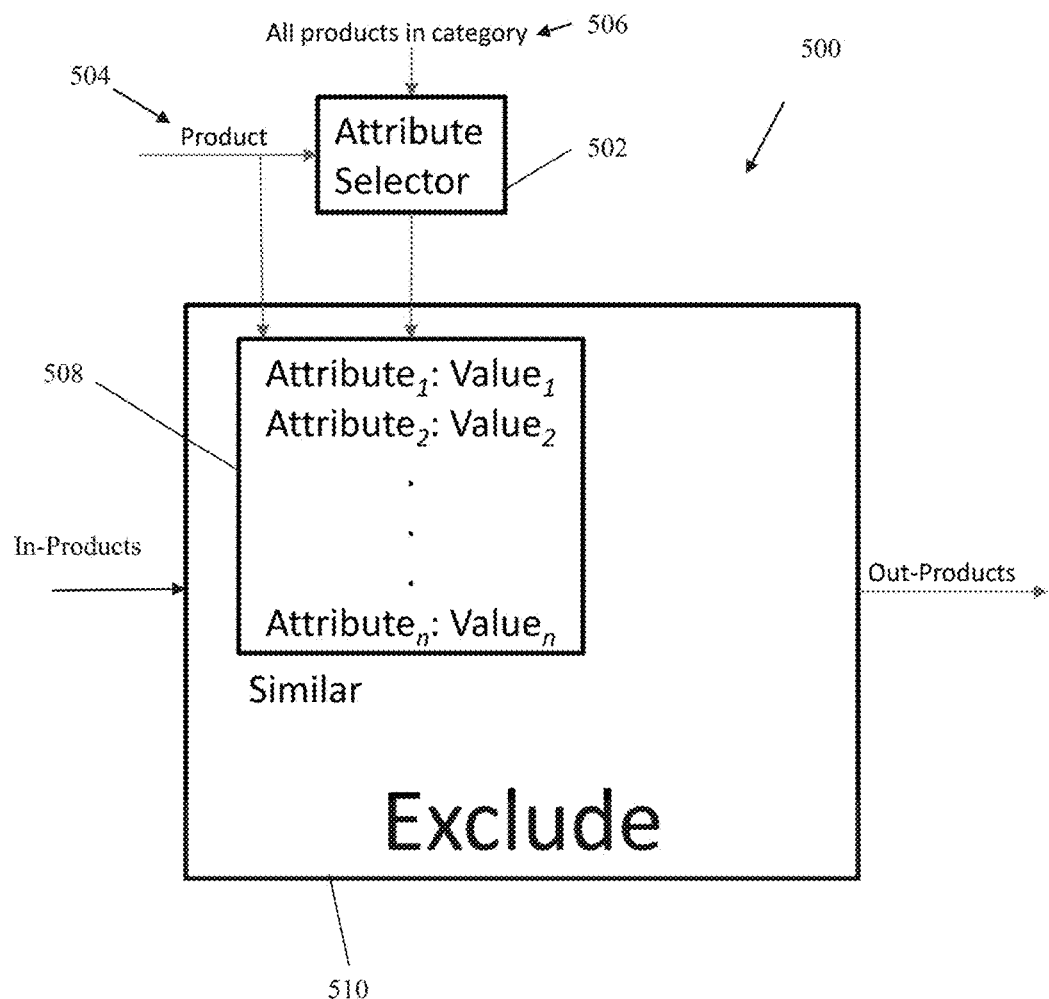
FIG. 5 is another block diagram of an exemplary implementation of a process for exclusion of objects, in accordance with some embodiments of the present invention.

Reference is now made to FIG. 5, which is another block diagram 500 of an exemplary implementation of a process for exclusion of objects, in accordance with some embodiments of the present invention.

An attribute selector module 502 (e.g., code stored in a program store implemented by a processor, optionally of a server) identified one or more attribute parameters. The attribute parameters may be rendered for presentation to the user within a GUI on a display of the client terminal. The attribute parameters may be identified according to a user selected object (e.g., product 504) and/or based on an analysis of attributes from other objects (e.g., other products 506 in the same category selected using a query). The analysis may include, for example, distribution of attribute values and/or weights assigned to the attribute parameters, for example, most popular attribute parameters and/or values according to the current user and/or other users. In another example, the attribute parameters used by module

502 are common and predefined, for example, a list based on popular attributes user look for when searching for a product in the current category. In another example, each product may be associated with different attributes. For example, by attribute weight and/or attribute popularity, and how many products will be excluded if the attribute is applied.

At 508, attribute parameters are identified for exclusion of objects. The attribute parameters may be selected individually (e.g., the user and/or code selecting the top ranked attributes) and/or as a group (e.g., all attributes of a selected object) (e.g., as in block 108). Alternatively, a similarity requirement may be selected to define the degree of a calculated similarity value between a selected object and other objects for exclusion (e.g., as in block 110). Similarity requirements may be selected for each attribute, or for the group of attributes, for examples, similarity requirements may be selected as a threshold for an attribute value.

Module 510 (i.e., code stored in the program store implemented by the processor of the server and/or client terminal) excludes objects from the set of In-products according to the selected attribute parameters and/or similarity requirements, to generate the Out-products set for presentation within the GUI. For example, when a certain attribute parameter is selected to be used as a basis for exclusion, similar products are excluded, to retain different products. For example, the retained products within the out-products set include products having different values for the attribute parameters, optionally different defined by the similarity (or difference) requirement. For example, when similar products are selected for exclusion, products that do not need the calculated similarity value according to the similarity requirement are excluded.

Reference is now made to FIGS. 6A-E, which are screen shots of an exemplary implementation of the GUI used for exclusion of objects, in accordance with some embodiments of the invention.

Figure 6A:
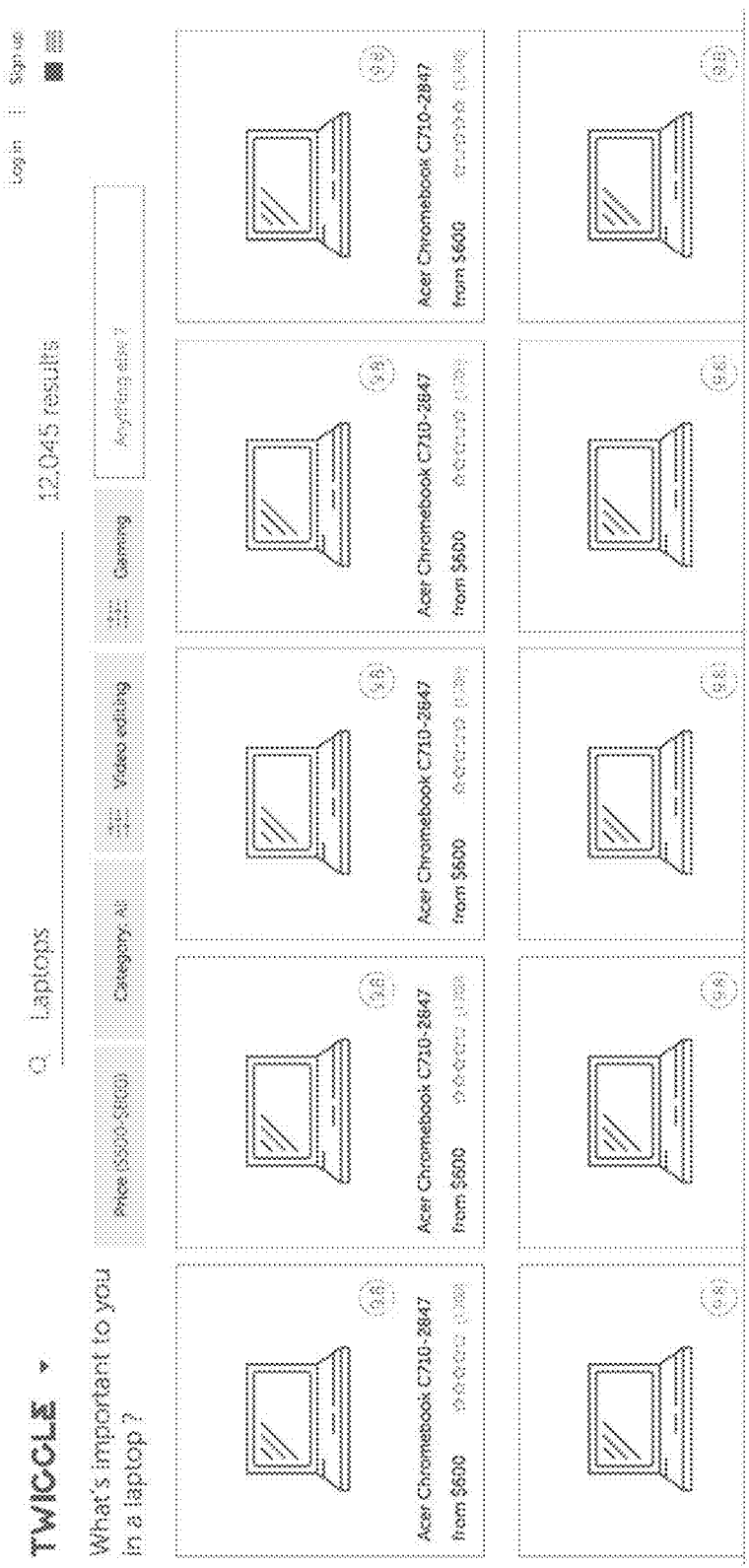
FIGS. 6A-6E are screen shots of an exemplary implementation of the GUI used for exclusion of objects, in accordance with some embodiments of the invention.

FIG. 6A depicts an example of a GUI presenting a rendered set of data objects selected from an objects database based on a query (e.g., as discussed with reference to blocks 102-104 of FIG. 1). For example, the query is laptop, and the objects include icons representing different laptops available for sale. The initial query resulted in 12045 results, which are too many for the user to navigate and manage.

Figure 6B:
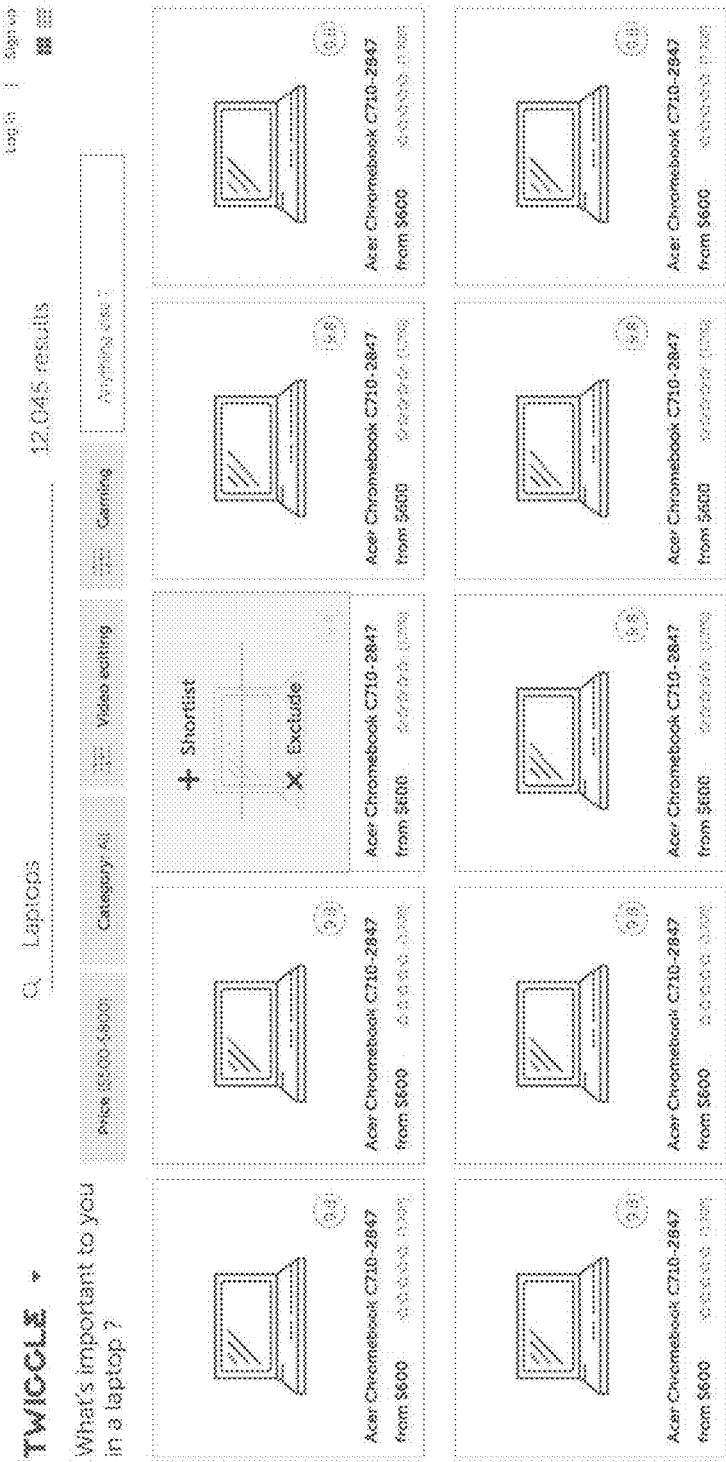

FIG. 6B depicts an example of the GUI presenting the option to exclude products that are similar to a user selected laptop (e.g., as discussed with reference to block 106 of FIG. 1).

Figure 6C:
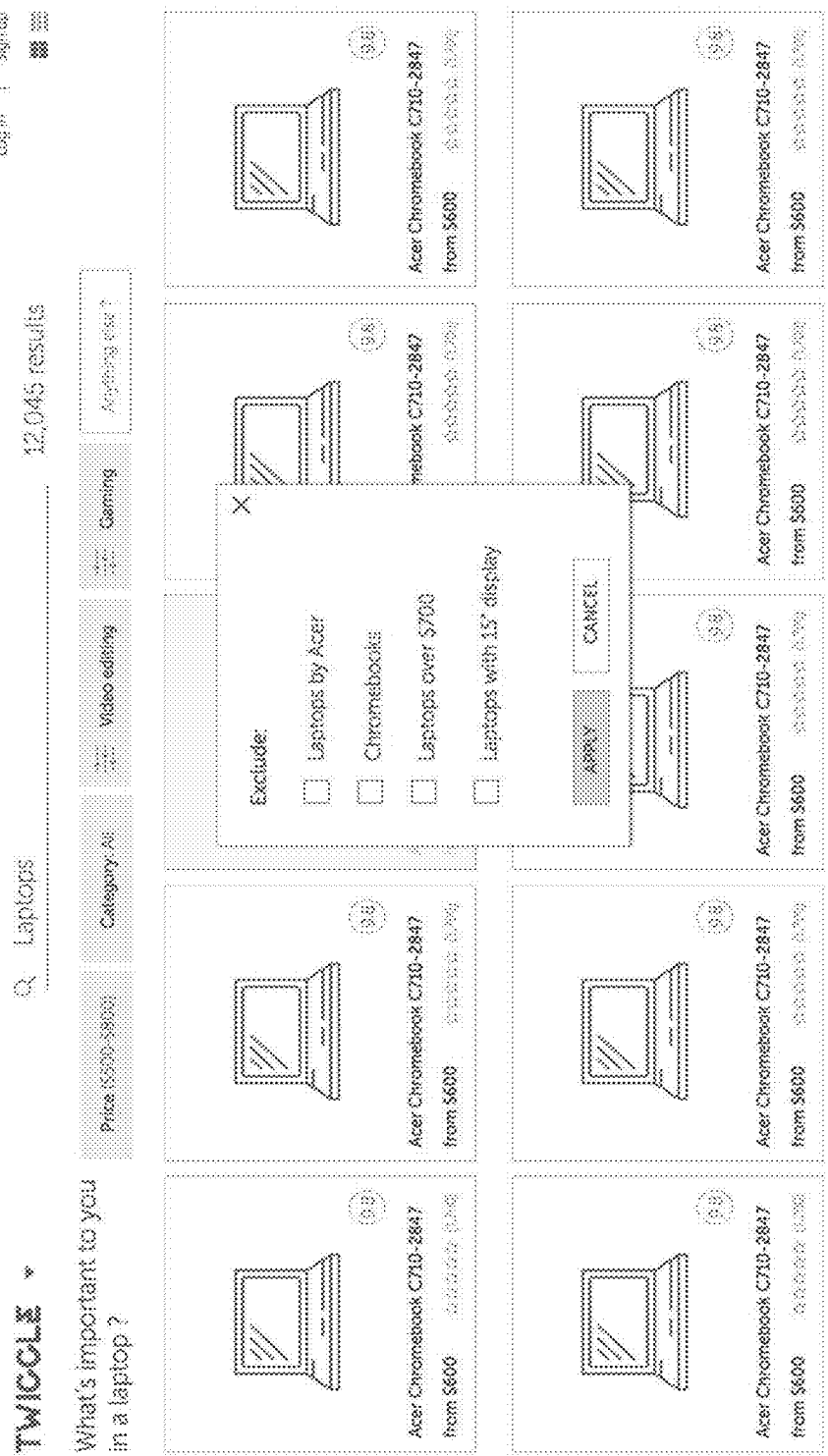

FIG. 6C depicts an example of the GUI presenting a list of attribute parameters associated with the user selected laptop (e.g., as discussed with reference to block 108 of FIG. 1).

Figure 6D:

FIG. 6D depicts an example of the user manually selecting the attribute parameter Laptops by Acer from the presented list. The selected attribute parameter, using the attribute value Acer will be used to exclude laptops made by Acer from the presented list.

Figure 6E:
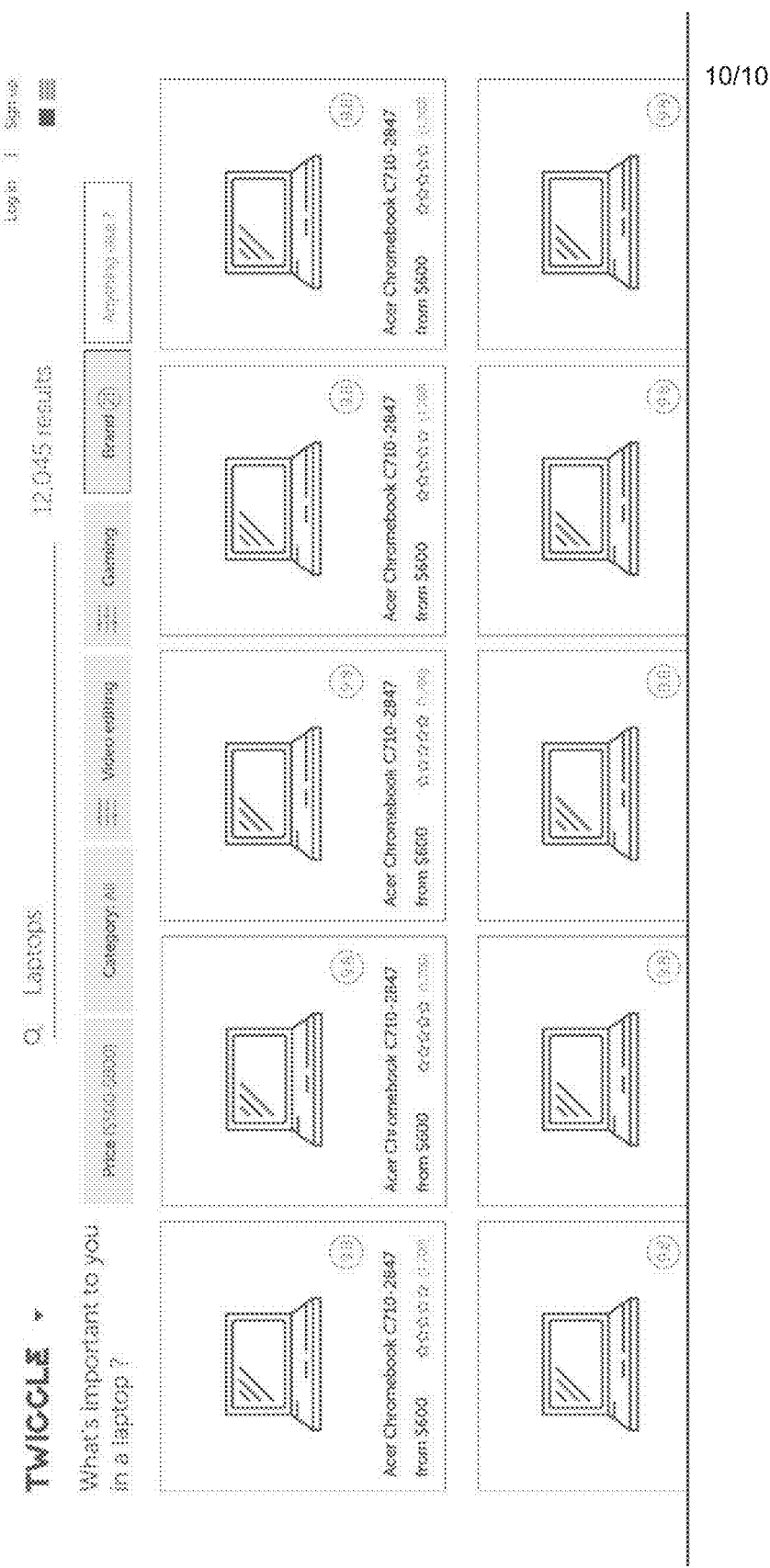

FIG. 6E depicts another example in which attribute parameters are used to exclude laptops from the presented set of laptops. The attribute parameter Brand includes 21 different attribute values (i.e., different brands) that may be selected by the user for exclusion. Laptops that have attribute values matching the user selected attribute values (i.e., brand) are excluded.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the terms client terminal, server, data object, and GUI are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method for dynamically updating a set of data objects within a graphical user interface presented on a display of a client terminal according to manual user input provided using a physical user interface of the client terminal, comprising:
   managing an object dataset defining a plurality of attribute values of a plurality of attribute parameters of each of a plurality of objects;
   receiving a query including at least one search term;
   applying the query to the object dataset to select, from said plurality of objects, a first set of objects complying with the at least one search term;
   in response to said query instructing rendering of the first set of objects within a graphical user interface (GUI) for presentation to a user on a display of a client terminal;
   detecting a selection of an object of the first set of objects, the selection performed by said user using a physical user interface in communication with the client terminal;
   automatically identifying which of said plurality of attribute parameters of said object is a differentiating parameter by evaluating differences between said plurality of attribute values of said plurality of attribute parameters of said object and respective said plurality of attribute values of respective said plurality of attribute parameters of members of said first set of objects;
   identifying a second set of objects from the first set of objects based on said differentiating parameter;
   excluding said second set of objects from the first set of objects to identify a third set of objects; and
   instructing dynamic rendering to update the GUI to present the third set of objects in response to said selection, wherein the third set of objects includes fewer members than the first set of objects;
   wherein the said selection is a single click or touch on an indication of the object.

2. The method of claim 1, wherein the differentiating parameter is added as at least one excluding term to the query.

3. The method of claim 1, wherein the differentiating parameter includes at least one differentiating feature that most differentiates the selected object from other objects of the first set.

4. The method of claim 1, further comprising dynamically creating an object filter according to the different attribute values of the differentiating parameter, and wherein excluding the second set of object to identify the third set of objects comprises applying the dynamically created object filter to the first set of objects.

5. The method of claim 1, wherein excluding comprises excluding the second set of objects based on different attribute values of the differentiating parameter within a similarity requirement, wherein the similarity requirement is selected to include a family of objects similar to the selected object serving as an example of the family of objects.

6. The method of claim 1, wherein identifying at least one attribute parameter of the plurality of attribute parameters is performed according to a ranking of attribute parameters having values that are most different between the selected object and other objects of the first set.

7. The method of claim 1, wherein identifying at least one attribute parameter of the plurality of attribute parameters is performed according to a ranking of attribute parameters having values that are most similar between the selected object and other objects of the first set.

8. The method of claim 1, wherein the method is iterated, by repeating the method substituting the third set of objects for the first set of objects.

9. The method of claim 1, further comprising instructing rendering of a GUI on the display to present options for selection of the at least one attribute parameter of the plurality of attribute parameters, and receiving the selection of the at least one attribute parameter from by a user using a physical user interface in communication with the client terminal.

10. The method of claim 1, further comprising:
    calculating a similarity value between the identified object and each member of the first set of objects;
    wherein the similarity value is calculated based on all or a subset of values of the differentiating parameter;
    identifying the second set of objects according to a requirement for a difference between values which is applied to the calculated requirement values;
    and wherein excluding the second set of objects from the first set of objects comprises excluding the identified second set of objects from the first set of objects.

11. The method of claim 10, wherein calculating the similarity value comprises calculating a weighted average of the differences between all or the subset of values of the differentiating parameter.

12. The method of claim 1, wherein the identifying at least one attribute parameter of the plurality of attribute parameters is performed according to at least one member selected from the group consisting of: a ranking of weights assigned to each attribute parameter of the selected object, a ranking of most popular attributes manually selected by other users, a ranking of attribute selections performed by the current user according to a history of previous actions; and a ranking of a number of other objects excluded by the at least one attribute parameter.

13. The method of claim 1, wherein the object represents a physical product or service.

14. The method of claim 13, wherein the attribute parameters define characteristics of the physical product or service, selected from the group consisting of: price, brand, model, and component size.

15. A system for dynamically updating a set of data objects within a graphical user interface presented on a display of a client terminal according to manual user input provided using a physical user interface of the client terminal, comprising:
- a network interface for communicating over a network with a plurality of client terminals each associated with a display and at least one physical user interface;
- a data repository storing an object dataset defining a plurality of attribute values of a plurality of attribute parameters of each of a plurality of objects; a program store storing code; and
- a processor coupled to the network interface, the data repository, and the program store for implementing the stored code, the code comprising:
- code to receive a query including at least one search term, and apply the query to the object dataset to select a first set of objects including at least one attribute parameter associated with the at least one search term;
- code to generate, in response to receiving said query, instructions to render the first set of objects within a graphical user interface (GUI) for presentation to a user on a certain display of a certain client terminal;
- code to determine a selection of an object of the first set of objects, the selection performed by said user using a physical user interface in communication with the certain client terminal;
- code to identify automatically which of said plurality of attribute parameters of said object is a differentiating parameter by evaluating differences between said plurality of attribute values of said plurality of attribute parameters of said object and respective said plurality of attribute values of respective said plurality of attribute parameters of members of said first set of objects;
- code to identify a second set of objects from the first set of objects based on said differentiating parameter;
- code to exclude said set of objects from the first set of objects to identify a third set of objects; and
- code to generate, in response to receiving said selection, instruction to dynamically render an update to the GUI to present the third set of objects, wherein the third set of objects includes fewer members than the first set of objects;
- wherein the selection is a single click or touch on an indicator of the object.

16. The system of claim 15, wherein the certain client terminal is a smartphone having limited space of the display, and wherein the identifying at least one attribute parameter is selected to sufficiently exclude the second set of objects such that members of the third set of objects fit on the limited space of the display.

17. A non-transitory computer readable storage medium dynamically updating a set of data objects within a graphical user interface presented on a display of a client terminal according to manual user input provided using a physical user interface of the client terminal, comprising instructions stored thereon, that when executed on a processor of a server in network communication with a plurality of client terminal perform the steps of:
- managing an object dataset defining a plurality of attribute values of a plurality of attribute parameters of each of a plurality of objects;
- receiving a query including at least one search term;
- applying the query to the object dataset to select, from said plurality of objects, a first set of objects complying with the at least one search term;
- in response to receiving said query, instructing rendering of the first set of objects within a graphical user interface (GUI) for presentation to a user on a display of a client terminal;
- determining a selection of at least one object of the first set of objects, the selection performed by said user using a physical user interface in communication with the client terminal;
- automatically identifying, in response to receiving said selection, which of said plurality of attribute parameters of said object is a differentiating parameter by evaluating differences between said plurality of attribute values of said plurality of attribute parameters of said object and respective said plurality of attribute values of respective said plurality of attribute parameters of members of said first set of objects;
- identifying a second set of objects from the first set of objects based on said differentiating parameter;
- excluding said second set of objects from the first set of objects to identify a third set of objects; and
- instructing dynamic rendering to update the GUI to present the third set of objects, wherein the third set of objects includes fewer members than the first set of objects;
- wherein the selection is a single click or touch on an indication of the object.

* * * * *